H. T. BLODGET.
Bird-Guard for Buildings.

No. 168,446. Patented Oct. 5, 1875.

WITNESSES
Geo. H. Earl.
John Fetherston

INVENTOR.
H. T. Blodget
Pr Brown Bros.
Attorneys

UNITED STATES PATENT OFFICE.

HENRY T. BLODGET, OF BOSTON, MASSACHUSETTS, ASSIGNOR TO HIMSELF AND CHARLES W. HOLDEN, OF SAME PLACE.

IMPROVEMENT IN BIRD-GUARDS FOR BUILDINGS.

Specification forming part of Letters Patent No. 168,446, dated October 5, 1875; application filed July 14, 1875.

*To all whom it may concern:*

Be it known that I, HENRY T. BLODGET, of Boston, in the county of Suffolk and State of Massachusetts, have invented a new and useful Improvement in the Protection of Buildings against Defilement by Pigeons and other Birds, of which the following is a specification:

This invention relates to the protection of the façades of buildings against being defiled by pigeons and other birds; and it pertains to means for preventing birds from alighting or perching or lodging on the projecting parts, such as the window caps and sills, keystones, arches, columns, cornices, moldings, belts, &c., of the façades of buildings, and thereby secure the protection of the façades against being defiled with the excrement or fecal matter of birds.

The object of the invention is to provide a means of protection for the purpose stated, which will not be obtrusive in and distasteful to the appearance of the façade to the building, and will be practically unobservable, while at the same time it will be effective in its prevention of the lodgment or alightment of birds at the parts of the buildings where it is applied; and for this object the invention consists in the application to and location upon the parts of the façades to a building which it is desired to protect against the lodgment or alightment of birds, of projecting pins which are arranged to cover sufficiently and substantially the resting-surface of said parts as to the alightment or lodgment of birds thereon, all as hereinafter particularly described.

Figure 1:
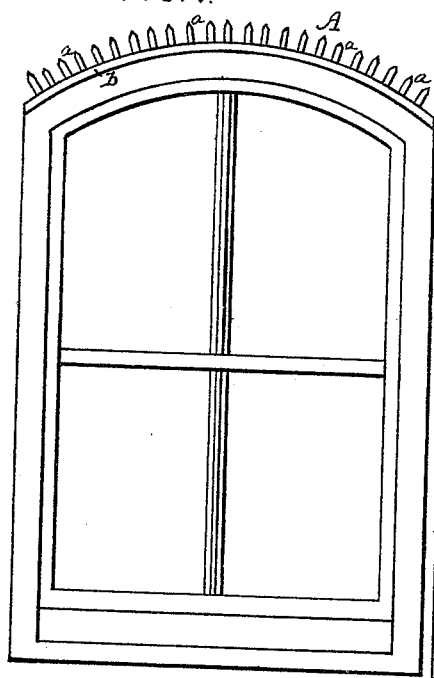
Figure 2:
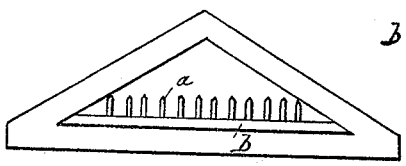
Figure 3:
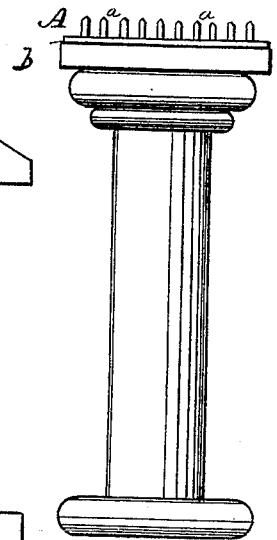
Figure 5:
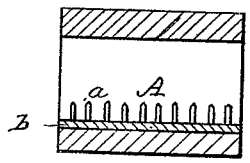
Figure 8:
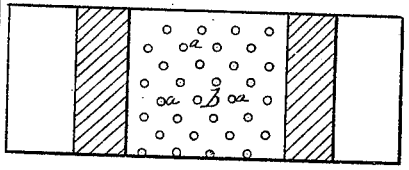
Figure 6:
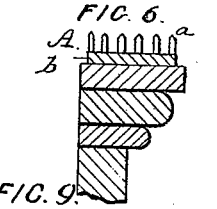
Figure 9:
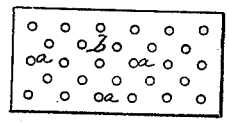
Figure 4:
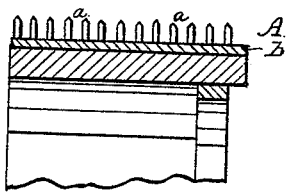
Figure 7:
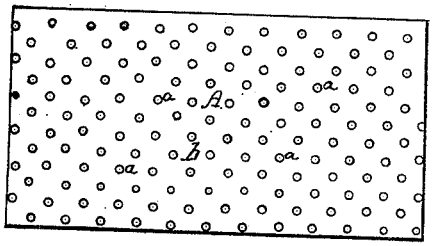

In the accompanying plate of drawings, the application of the present invention is shown in connection with several projecting parts of the façade, Figure 1 illustrating it as applied to the cap of a window, Fig. 2 as to a pediment, and Fig. 3 to an abacus of a column, and of the several figures, respectively. Figs. 4, 5, and 6 are vertical cross-sections, and Figs. 7, 8, and 9, plan views.

In the drawings, A represents the present improved protection of buildings against defilement by pigeons and other birds. The protection A consists of numerous pins or prongs, *a*, which are located upon those parts of a façade of a building that will allow a bird to alight or lodge, and which are arranged to project therefrom to cover and embrace the resting-surface of said parts for birds sufficiently to make it substantially impossible for a bird to alight or lodge thereon, and, should a bird succeed in making a lodgment, to render his position so uncomfortable as to insure his quick departure from and abandonment of his perch.

A protection, A, such as above described, will prevent the defilement of a building-façade to which it is applied, and in a manner which will not be obtrusive or unsightly in appearance, as, obviously, the pins necessary to accomplish the purpose under the arrangement described may be small, and practically imperceptible to view.

A convenient manner of attaching the protecting-pins *a* above described is, to first arrange and fasten them to a sheet of the proper size and shape, and then apply and secure the sheet to the surface where the protection stated is desired, and in the drawings this is the mode illustrated, *b* being the said sheet in the several illustrations.

An article suitable for this invention, and one which is readily attainable, is card-clothing, so known, and obviously it may be fastened in position conveniently by cement or by nails, or by interlocking it at its edges with the seams, or with the parts of a building during or after its erection.

If deemed desirable, the pins *a* may be sharpened at their points, and, if sharpened, obviously it would not be necessary to locate them as closely together as it probably would be if blunt, in order to secure the result aimed at by this invention.

Having now described my invention, what I claim, and desire to secure by Letters Patent, is—

Pins or projections *a*, located and applied to the façade of a building, all substantially as described, and for the purpose specified.

The above specification of my invention signed by me this 15th day of May, A. D. 1875..

H. T. BLODGET.

Witnesses:
EDWIN W. BROWN,
GEO. H. EARL.